(12) United States Patent
Bode et al.

(10) Patent No.: US 7,680,210 B2
(45) Date of Patent: Mar. 16, 2010

(54) METHOD FOR GENERATING I/Q SIGNAL IN A TDMA TRANSMITTER AND CORRESPONDING MODULATOR

(75) Inventors: Peter Bode, Nürnberg (DE); Harald Bauer, Nürnberg (DE); Rainer Dietsch, Heroldsberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 1103 days.

(21) Appl. No.: 10/525,473

(22) PCT Filed: Aug. 14, 2003

(86) PCT No.: PCT/IB03/03768

§ 371 (c)(1),
(2), (4) Date: Feb. 23, 2005

(87) PCT Pub. No.: WO2004/021659

PCT Pub. Date: Mar. 11, 2004

(65) Prior Publication Data

US 2005/0249312 A1 Nov. 10, 2005

(30) Foreign Application Priority Data

Aug. 28, 2002 (EP) .................................. 02102229

(51) Int. Cl.
*H04K 1/02* (2006.01)
*H04L 25/03* (2006.01)
*H04L 25/49* (2006.01)

(52) U.S. Cl. .................... 375/297; 375/305; 375/308

(58) Field of Classification Search ................. 375/133, 375/302–309, 329–336, 377, 229–230, 295–297, 375/312; 332/103, 11, 144–148
See application file for complete search history.

(56) References Cited

U.S. PATENT DOCUMENTS 5,852,630 A * 12/1998 Langberg et al. ............ 375/219

(Continued)

FOREIGN PATENT DOCUMENTS

JP 07023066 1/1995

OTHER PUBLICATIONS

Vankka J et al: "A GSM/EDGE/WCMA modulator with on-chip D/A converter for base station" IEEE International Sold-State Circuits Conference. Digest of Technical Papers, San Francisco, USA, vol. 1, Feb. 5, 2002, pp. 236-463, USA p. 236, right-hand column, paragraph 1 figure 14.4.3.*

(Continued)

*Primary Examiner*—Shuwang Liu
*Assistant Examiner*—James M Perez
(74) *Attorney, Agent, or Firm*—Robert Iannucci; Seed IP Law Group

(57) ABSTRACT

The present invention relates to a digital I/Q modulator which efficiently supports multi-time-slot operation of wireless TDMA transmitters employing linear power amplifiers. According to the present invention, dips are introduced in the envelope of the I/Q signal in the guard interval between adjacent time-slots or bursts. The dips avoid interference on adjacent radio frequency channels when the gain of the TX chain in switched abruptly in order to change the power level of the TX signal or when the modulation scheme is changed. Also, a method is provided for generating the dips, which is particularly attractive if the modulation scheme in adjacent time-slots changes from GMSK to 8PSK or vice versa.

16 Claims, 5 Drawing Sheets

U.S. PATENT DOCUMENTS

| | | | |
|---|---|---|---|
| 5,990,755 A | 11/1999 | Takaaki | |
| 6,438,115 B1* | 8/2002 | Mazur et al. | 370/330 |
| 6,587,513 B1* | 7/2003 | Ichihara | 375/296 |
| 6,865,235 B2* | 3/2005 | Khoini-Poorfard | 375/272 |
| 2002/0085623 A1* | 7/2002 | Madkour et al. | 375/148 |
| 2002/0168026 A1* | 11/2002 | Khoini-Poorfard | 375/303 |
| 2003/0160654 A1* | 8/2003 | Fischer et al. | 330/129 |
| 2004/0208157 A1* | 10/2004 | Sander et al. | 370/345 |

OTHER PUBLICATIONS

Vankka J et. al.; A GSM/EDGE/WCDMA Modulator Wigh On-Chip D/A Converter for Base Stations; Feb. 2002; vol. 1,5, pp. 236-463; USA.

P. Jung's; Laurent's Representation of Binary Digital Continuous Phase Modulated Signals with Modulation Index 1/2 Revisited, IEEE; vol. 42, No. 2/3/4/, Feb./Mar. 1994.

* cited by examiner guard symbols  3 tail sym.  data sym.    data sym.  3 tail sym.  guard symbols

8 PSK ⟶ GMSK

C0 MUX  8|8|8|8|8|8|z|z|z|z|z|z|z|z|G|G|G|G|G|G|G ····

C1 MUX  z|z|z|z|z|z|z|z|z|z|z|z|z|z|G|G|G|G|G|G|G ···· data sym.  3 tail sym.   8 guard sym.   3 tail sym.  data sym.

GMSK ⟶ 8 PSK

C0 MUX  G|G|G|G|G|G|G|z|z|z|z|z|z|z|8|8|8|8|8|8 ····

C1 MUX  G|G|G|G|G|G|G|z|z|z|z|z|z|z|z|z|z|z|z|z ···· data sym.  3 tail sym.   8 guard sym.   3 tail sym.  data sym.

METHOD FOR GENERATING I/Q SIGNAL IN A TDMA TRANSMITTER AND CORRESPONDING MODULATOR

The present invention relates to a modulator for generating a digital I/Q signal having a plurality of time-slots, to a signal processing method for generating a digital VQ signal having a plurality of time-slots and to a computer program for a time division multiple access (TDMA) transmitter for a global system for mobile communications (GSM), enhanced data rates for GSM evolution (EDGE) or enhanced general packet radio service (EGPRS) system.

In 1997, a suggestion for EDGE was filed at the European Standardization Institute, ETSI. The standardization of EDGE will be carried out in two phases. A part of the first phase specifies EGPRS, which is an extension of the existing GPRS. EGPRS introduces the 8PSK (phase shift keying) modulation scheme, which has the potential for higher data rate than the established GMSK (Gaussian minimum shift keying) modulation scheme. This new 8PSK modulation scheme has more stringent requirements with respect to the linearity of the power amplifier in the TX (transmission) chain since, in contrast to GMSK, the amplitude is not constant. Therefore, while the constant envelope of the GMSK enabled the employment of a saturated power amplifier (PA), which is more power efficient than a linear PA, the variable envelope of the 8PSK modulation scheme demands for a linear PA.

When the 8PSK modulation scheme is employed in multi-time slot (TS) operation. It is required to adjust the TX power for every TS individually as demanded by the BSC. The TX power transient between the TSs should be smooth. Otherwise, if the TX power transient between the TSs is not smooth, interferences may occur with other users on adjacent channels. Due to this, it is normally not possible to simply switch the gain of the TX path abruptly. In addition to that, the gain of the TX path is usually varied in the analogue domain. Due to this, a continuous variable gain amplifier (VGA) is required in the TX chain, for adjusting the TX power level. Such a VGA is controlled by an appropriately shaped analogue control voltage. The provision of a VGA and the generation of the appropriately shaped analogue control voltage are expensive. In addition to that, such an arrangement is prone to defects, which are inherent to such an analogue circuitry. In addition to that, such an analogue circuitry has tolerances which, as known to the person skilled in the art, are always trouble to deal with.

Another problem arises in multi TS operation, when the modulation scheme in adjacent TSs is changed from 8PSK to GMSK or vice versa: such a switching between 8PSK and GMSK may provoke discontinuities in the digital I/Q signals. Such discontinuities must be avoided since they are very broadband and may cause interference on other channels.

The requirement for smooth TX power ramping is fundamental to any multiple access system, which combines TDMA and frequency division multiple access (FDMA). Therefore, the applied standards reserve a time interval between adjacent TSs, which is dedicated to power ramping and in which no data transfer occurs.

According to the GSM standard, this time interval is denoted as "guard interval".

The introduction of GPRS led to the extension of the first method towards multi time slot operation. Here, the power ramping voltage has a step shape with smooth edges.

It is an object of the present invention to minimize interferences between adjacent time slots.

According to an exemplary embodiment of the present invention, this object is solved with a modulator for generating a digital I/Q signal having a plurality of time slots, the modulator comprising means for introducing a dip in an envelope of the digital I/Q signal in a guard interval between adjacent time slots of the plurality of time slots.

Such modulator according to an exemplary embodiment of the present invention allows the use of a linear power amplifier in the digital I/Q modulator supporting multi time slot operation of wireless TDMA transmitters. In other words, the difficulties, which are encountered in a linear transmitter for EGPRS, may be overcome by introducing dips in the envelope of the digital or I/Q signal during the guard interval between adjacent time slots. Furthermore, the introduction of dips in the envelope of the digital or I/Q signal may have the effect that unwanted abrupt switching transients in the TX signal due to abrupt switching of the gain of the TX path can be avoided. This can be done by switching the gain of the TX path during the dip in the I/Q signal when the TX signal is down. Accordingly, interference between adjacent channels occurring with a change of the TX power level between adjacent time slots is minimized.

Furthermore, with the introduction of dips in the envelope of the digital I/Q signal during the guard interval between adjacent time slots, unwanted discontinuities in the I/Q signal when switching between the 8PSK and the GMSK modulation scheme may be avoided. Accordingly, interferences in adjacent channels occurring when switching between 8PSK and GMSK may be minimized.

Furthermore, a discrete gain VGA rather than a continuous gain VGA may be employed in the modulator. Also, since the dips are introduced in the digital domain, there is no trouble with tolerances of analogue circuitry. In addition to that, the present invention makes a generation of the analogue control voltage for the continuous VGA obsolete.

According to another exemplary embodiment of the present invention, both, the I and the Q signal are multiplied with a dip-shaped waveform which allows for a very simple solution for introducing the dips.

According to an exemplary embodiment of the present invention, the dip shaping is for free because the pulse shaping filter is usually provided for 8PSK.

According to an exemplary embodiment of the present invention, zeros are filled into the pulse shaping filter during the guard interval. By filling zeros into the pulse-shaping filter during the guard interval, the dip is introduced in the envelope of the digital I/Q signal. Since the generation of digital zeros is simple and not prone to malfunctions, a very simple and stable modulator avoiding interference between adjacent channels is provided.

Yet another exemplary embodiment of the present invention, allows for the efficient introduction of the dips into the envelope when GMSK modulated time-slots are involved. Furthermore, the exemplary embodiment of the present invention allows for a re-use of a CO filter for the GMSK instead of an independent GMSK modulator.

According to another exemplary embodiment of the present invention, the modulator is a GMSK modulator and a 8PSK modulator and allows to use both modulations schemes, the GMSK modulation scheme and the 8PSK modulation scheme.

According to yet another exemplary embodiment of the present invention, a signal processing method is provided, which minimizes interference in adjacent channels.

According to yet other exemplary embodiments of the present invention, signal processing methods are provided, wherein the dips are generated by a multiplication of the I signal and the Q signal with dip-shaped waveforms and by means of the pulse shaping filter. Both methods allow a very simple and efficient control of the modulation. Also, if the dip is introduced by means of the pulse shaping filter, the dip shaping is for free.

According to the present invention, there is also provided a computer program for a TDMA transmitter for a GSM-, EDGE- or EGPRS-system.

As apparent from the above, a digital I/Q modulator is suggested which efficiently supports multi-time slot operation of wireless TDMA transmitters employing a linear power amplifier. It is an aspect of the present invention to introduce dips in the envelope of the digital I/Q signal in the guard interval between adjacent time slots. These dips avoid interference on adjacent radio frequency channels when the gain of the TX chain is switched abruptly, in order to change the power of the TX signal. In addition, a signal processing topology is suggested for generating the dips which is in particular attractive if the modulation scheme in adjacent time slots changes from GMSK to 8PSK, or vice versa.

These and other aspects of the present invention will be apparent from and elucidated with reference to the embodiments described hereinafter. These embodiments will be described with reference to the following Figures.

In the following description of the above Figures, the same reference numbers are used for the same or corresponding elements.

Figure 1:
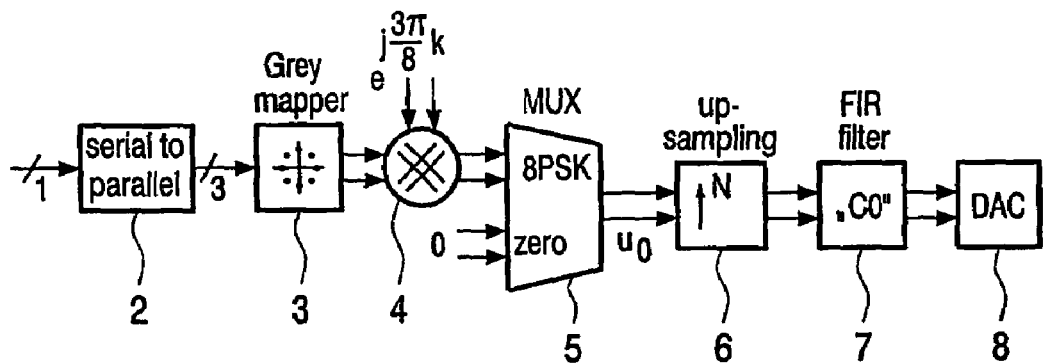
FIG. 1 shows a single slot 8PSK I/Q modulator according to an aspect of the present invention.

FIG. 1 shows a simplified circuit diagram of a single slot 8PSK I/Q modulator 1, according to an aspect of the present invention. When the modulator of FIG. 1 is applied in a GSM system, the speech signal is quantized in the speech coding, and then, the quantized speech signal is organized into data frames during channel coding. The serial data stream is then introduced into the serial to parallel converter 2, which may be, as shown in FIG. 1, a three-bit serial to parallel converter. The three-bit parallel signal is then input to a Grey Mapper 3 which maps each bit triplet on one out of eight complex signals. Then, a $3\pi/8$ rotation is carried for each symbol by means of complex multiplier 4. This is done to avoid zero crossings in the RF envelope. After a multiplexing of the signal in the multiplexer (MUX) 5, the output of the MUX 5 is input to an up-sampler 6 by which carries out an up-sampling N=16, which inserts N-1 zeros after every input sample. The output of the up-sampler 6 is input to a Finite Impulse Response (FIR) pulse-shaping filter, here referred to with C0. In another exemplary embodiment, up sampling and FIR filtering may be merged in a more efficient polyphase interpolation filter structure. The output of the FIR 7 is input to a digital to analogue converter (DAC) 8.

During operation, the MUX 5 selects between zeros during the guard period of the TDMA signal, and rotated 8PSK symbols during the active part of the burst. This is illustrated in further detail in FIG. 2.

Figure 2:
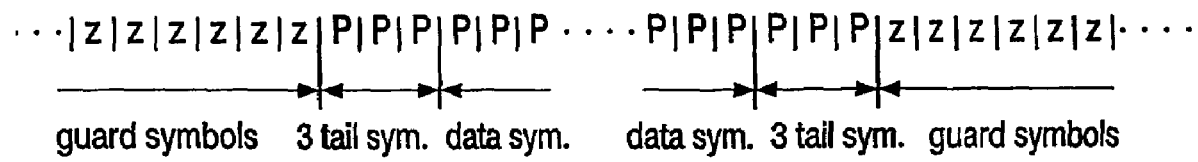
FIG. 2 shows a setting of the 8PSK MUX of the modulator of FIG. 1 during begin and at the end of a burst according to an aspect of the present invention.

FIG. 2 shows a setting of the 8PSK MUX 5 of FIG. 1 during begin and end of a burst. As can be taken from FIG. 2, during the guard symbols, zeros are filled into the MUX 5. During the leading three tail symbols, the data symbols and the trailing three tail symbols, the rotated 8PSK symbols are inserted into the MUX 5. At the end of the data symbol, the 8PSK symbol is maintained at the MUX 5 until the end of the three tail symbols. With the beginning of the following guard symbols, zeros are inserted into the MUX 5.

Feeding the up-sampler/filter with zeros has the following effect: the leading zeros enable a smooth step-on response of the filter when it is excited by the early rotated 8PSK symbols. The trailing zeros filling the late rotated 8PSK symbols enable a smooth step-off response.

Figure 3:
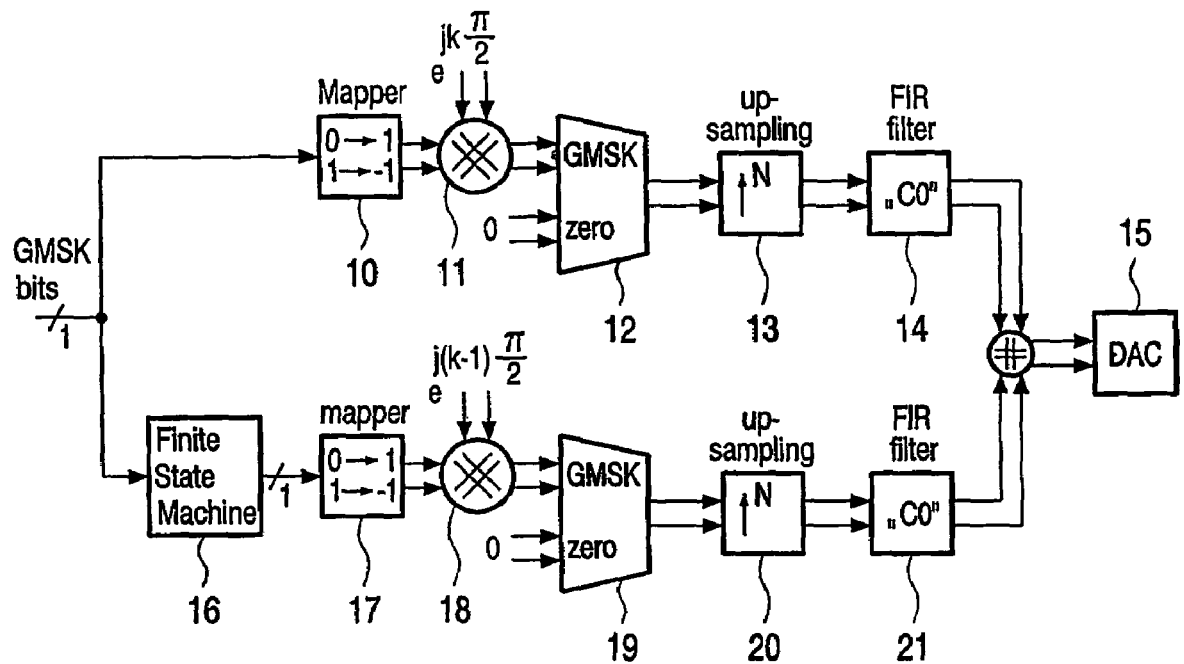
FIG. 3 shows a single slot quadratic GMSK I/Q modulator according to an aspect of the present invention.

FIG. 3 shows an exemplary embodiment of a single slot quadratic GMSK I/Q modulator 9, according to an aspect of the present invention. FIG. 3 is a simplified circuit diagram. GMSK is a non-linear modulation scheme with pulse-shaping in the phase domain in contrast to linear modulation schemes with pulse shaping in the I/Q domain. As suggested in P. Jung's, "Laurent's decomposition of Binary Digital Continuous Phase Modulated Signals with Modulation Index 1/2 Revisited" IEEE transactions on communications, vol. 42, No. 2/3/4, 1994, one may implement a GMSK modulator by superimposing a series of linearly modulated signals. The corresponding shaping filters are denoted as C0, C1, ... Cn.

The input of the FIR filter C0 14 is generated as follows: the GMSK bits are inserted into a mapper 10. The output signal of the mapper 10 is input to a digital multiplier 11, which multiplies the output signals of the mapper 10 with a complex phasor $e^{jk\pi/2}$. The multiplied signals are provided to a MUX 12 which output signals are provided to an up-sampler 13, corresponding to the up-sampler 6 in FIG. 1. The output signal of the up-sampler 13 is input to the FIR filter C0 14 which output signal is added to the output signal of FIR filter C1 21 and supplied to the DAC 15. The DAC 15 corresponds to the DAC 8 of FIG. 1.

The input of the FIR filter C1 21 is obtained from the modulating bits by applying a Finite State Machine (FSM) 16, a mapper 17 and a multiplication by means of a digital multiplier 18 with a complex phasor $e^{j(k-1)\pi/2}$. The output signal of the digital multiplier 18 is input into the MUX 19 which output signal is provided to the up-sampler 20. The output signal of the up-sampler 20 is provided to the FIR filter C1 21. The up-sampler 20 corresponds to the up-sampler 6 of FIG. 1.

In general, the input of a shaping filter Cn is obtained from the modulating bits by applying a FSM, a mapper and a multiplication with a complex phasor $e^{jk\pi/2}$. The FSM algorithm and the phase $\theta_n$ of the phasor depend on the index n of the element of the series. Accordingly, as shown in FIG. 3, for n=0, no FSM at all is required and $\theta_0=0$ applies. Since merely the $0^{th}$ element of the series is used, this is denoted as linearized GMSK. Accordingly, the upper branch in FIG. 3 is referred to as linear branch of the GMSK modulator. Here, it is to be noted that the C0 filter is adopted as the shaping filter for 8PSK to obtain a power spectral density (PSD) which is similar to the PSD of the GMSK. By considering the higher order elements of the series, the approximation error can be made arbitrarily small. In the practical application, it is sufficient to consider just the elements 0 and 1 of the series. The lower branch of the modulator of FIG. 3 is also referred to as quadratic branch of the GMSK modulator.

The quadratic GMSK modulator as shown in FIG. 3 has the advantage that the pulse-shaping filters may be applied for envelope shaping in the same way as described with reference to the 8PSK modulator depicted in FIG. 1. This will be described further with reference to FIG. 4.

Figure 4:
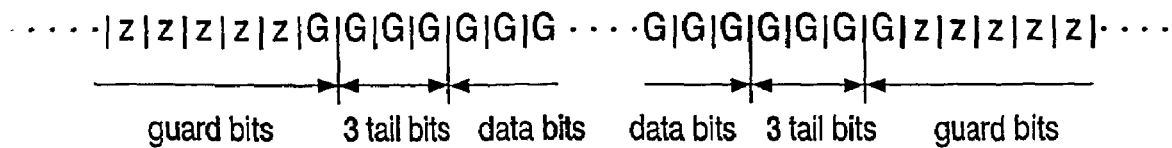
FIG. 4 shows a setting of the GMSK multiplexer in the modulator of FIG. 3 during begin and end of a time slot according to an aspect of the present invention.

FIG. 4 shows an exemplary setting of the MUXs 12 and 19 of FIG. 3 during begin and an end of a time slot or burst. The left-hand side of FIG. 4 shows the setting during begin of a time slot and the right-hand side of FIG. 4 shows the setting at the end of a time slot. As may be taken from FIG. 4, zeros are inserted by the MUXs 12 and 19 during all guard bits except the last guard bit of the leading guard interval and the first guard bit of the trailing guard interval. From the last bit of the leading guard interval to the first bit of the trailing guard interval, the GMSK signals are supplied to the u-samplers 13 and 20. This setting of the innermost and outmost guard symbols to the GMSK signals is compulsory for GMSK, because the phase error in the region of the outermost tail bits would otherwise increase too much.

The modulator of FIG. 3 with a setting of MUXs 12 and 19 as shown in FIG. 4 allows for smooth edges of the TX envelope.

Figure 5:
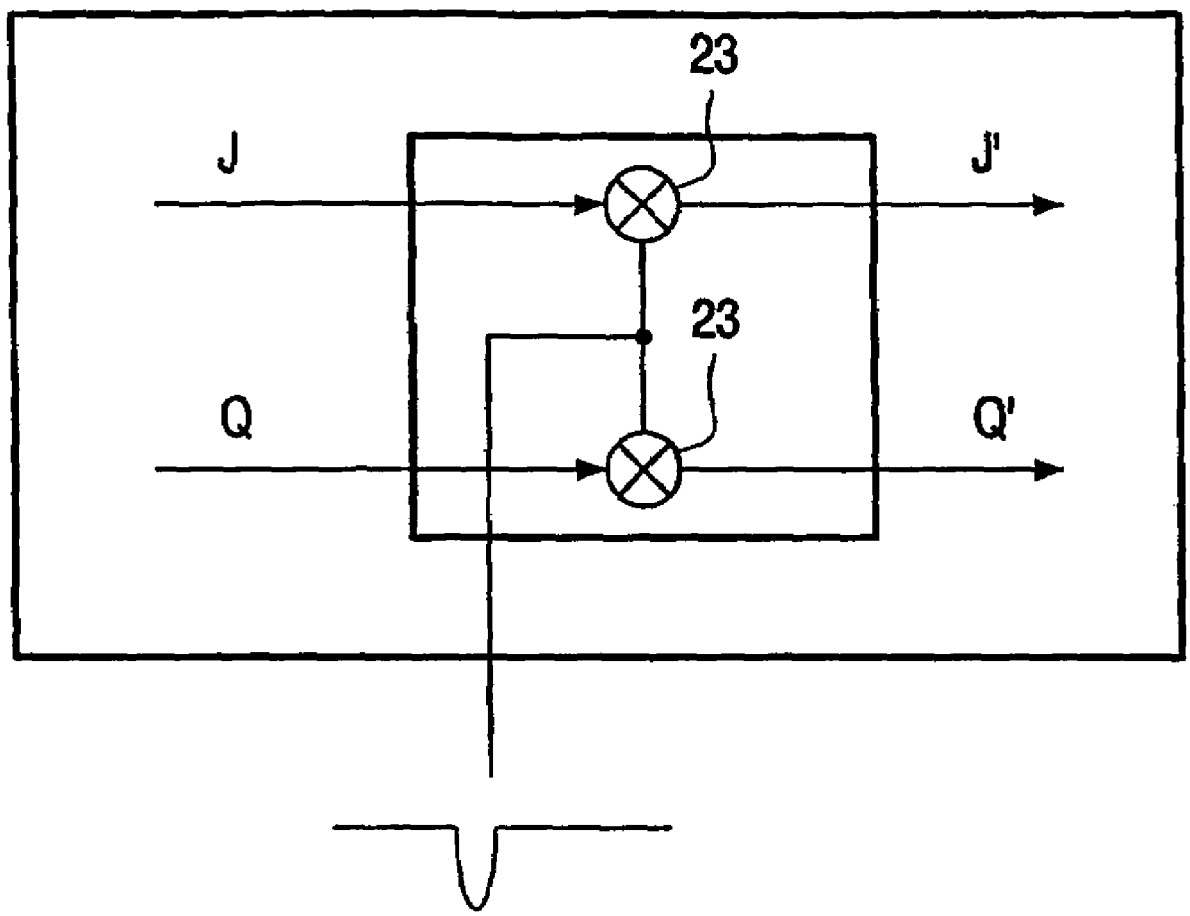
FIG. 5 shows a modulator with a digital multiplier for multiplying the digital I/Q signals with a dip-shaped waveform according to an aspect of the present invention.

FIG. 5 shows a simplified sketch of a digital I/Q modulator 22, comprising digital multipliers 23. I/Q signals are provided to the digital multipliers 23 which multiply each I signal and each Q signal with a dip-shaped waveform generating digital signals I' Q' having a dip in the envelope. The digital multipliers 23 introduce the dips in the envelope of the digital VQ signal in the guard interval of subsequent time slots. In principle, the digital I/Q modulator may be a 8PSK modulator 1, as shown in FIG. 1, a GMSK modulator 9, as shown in FIG. 3, or a combination of both modulators 1 and 9, or parts thereof.

Figure 6:
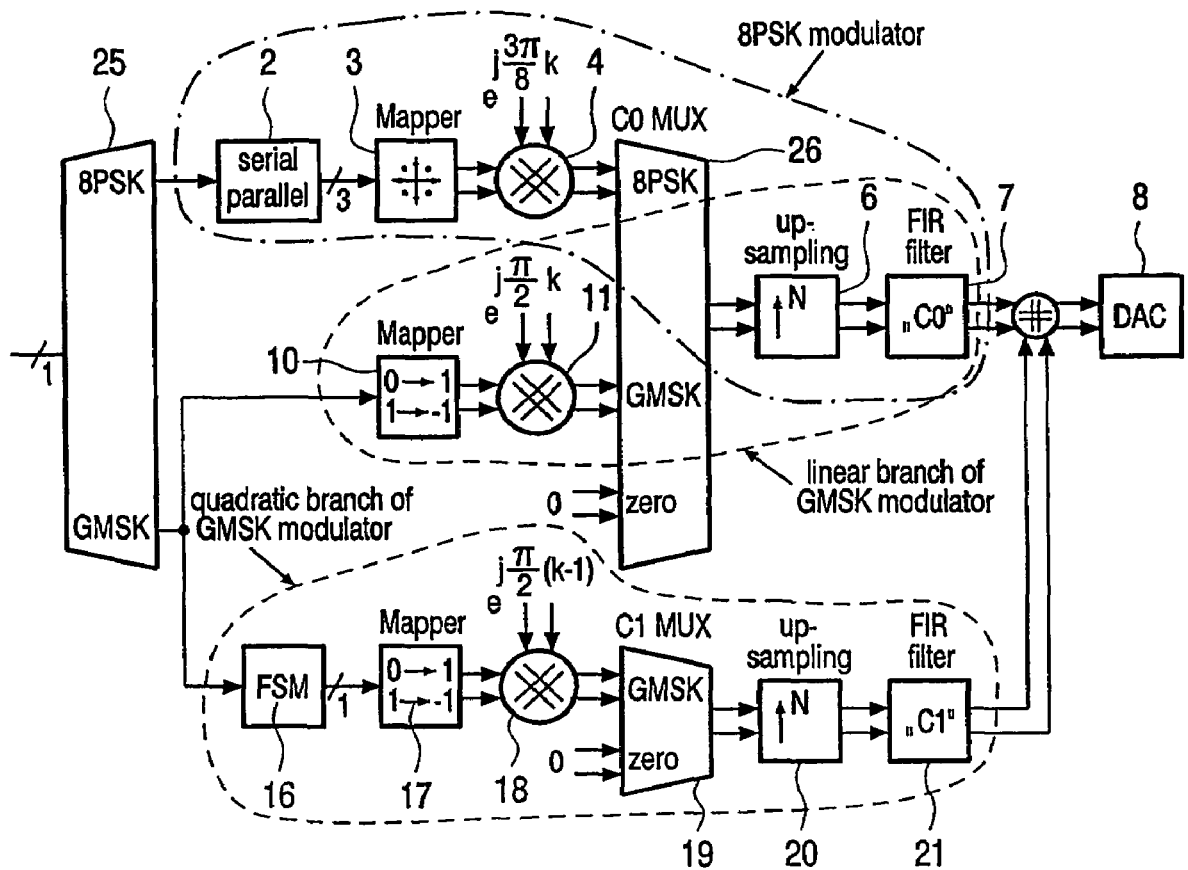
FIG. 6 shows a multi-slot 8PSK/GMSK I/Q modulator, according to an aspect of the present invention.

FIG. 6 shows a multislot 8PSK/GMSK I/Q modulator 24, according to an exemplary embodiment of the present invention. On a first glance, the modulator 24 of FIG. 6 is a combination of the 8PSK modulator 1 of FIG. 1 and the quadratic GMSK modulator 9 of FIG. 3. The modulator 24 of FIG. 6 comprises an 8PSK modulator comprising the three-bit serial to parallel converter 2, the grey mapper 3, the complex multiplier 4, a multiplexer 26 referred to as C0 MUX which will be described in the following, an up-sampler 6 and a FIR filter C0 7. A linear branch of the GMSK modulator comprises the mapper 10, the complex multiplier 11, the C0 MUX 26, the up-sampler 6 corresponding to the up-sampler 13 of FIG. 3 and the FIR filter C0 7 corresponding to the FIR filter C0 14 of FIG. 1. A quadric branch of the GMSK modulator, comprises the FSM 16, the mapper 17, the complex multiplier 18, the GMSK MUX 19, now referred to as C1 MUX, the up-sampler 20 and FIR filter C1 21. Furthermore, the modulator 24 of FIG. 6 has a multiplexer 25 which provides the serial data stream to be modulated with the 8PSK modulation scheme to the serial to parallel converter 2, and which provides the serial data stream to be modulated with the GMSK modulation scheme to the mapper 10 and the FSM 16. In case the 8PSK modulation scheme is applied, the output signal of the FIR filter C0 is provided directly to the DAC 8. In case the GMSK modulation scheme is applied, the output of the FIR filter C0 7 and of the FIR filter C1 21 are added and applied to the DAC 8. The multiplexers C0 MUX 26, C1 MUX 19 and multiplexer 25 enable the two-mode operation of the modulator: the 8PSK mode and the GMSK mode. Furthermore, these multiplexers enable configuration of the modulator as 8PSK modulator, GMSK modulator or linearized GMSK modulator.

Figure 7:
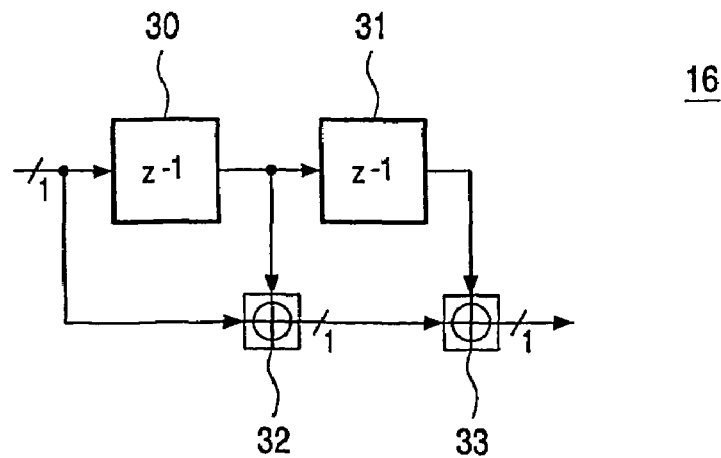
FIG. 7 shows a Finite State Machine (FSM) in the quadratic branch of the GMSK modulator of FIG. 6, according to an aspect of the present invention.

FIG. 7 shows the Finite State Machine 16 and the quadratic branch of the GMSK modulator with more detail. As can be taken from FIG. 7, the FSM 16 comprises a first register 30 and a second register 31 and a first modulo 2 adder 32 and a second modulo 2 adder 33. The input of the FSM 16 is provided to the first register 30 and to the modulo 2 adder 32. The output of the first register 30 is provided to the second register 31 and to the first modulo 2 adder. The outputs of the second registers 31 and the first modulo 2 adder 32 are provided to the second modulo 2 adder 33 and then output to the mapper 17.

Figures 8, 9:
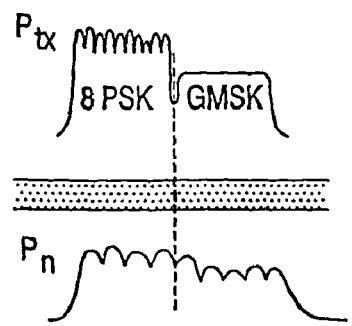
FIG. 8 shows a setting of the C0 MUX and the C1 MUX of the modulator of FIG. 6 during the transition between an 8PSK time slot and a GMSK time slot, and vice versa, according to an aspect of the present invention.
FIG. 9 illustrates by means of a hypothetical multi-slot TX envelope a switching between 8PSK and GMSK at different power levels in adjacent time slots.

A sequence of the C0 MUX 26 and C1 MUX 19 settings during the transition from an 8PSK burst to a GMSK burst is depicted in FIG. 8.

FIG. 8 shows an exemplary setting of C0 MUX 26 and C1 MUX 19 during the transition from an 8PSK time slot and a GMSK time slot and vice versa As may be taken from FIG. 8, the C0 MUX 26 provides in the 8PSK mode the 8PSK signal to the up-sampler 6 throughout the data signal and the three tail symbols. Then, during the first seven guard symbols, the C0 MUX 26 provides zeros to the up-sampler 6. During the last guard symbol, the C0 MUX 26 provides the GMSK signal of the linear branch of the GMSK modulator to the up-sampler 6. Then, during the three tail symbols and the following data symbols, the C0 MUX 26 provides the GMSK signal of the linear branch of the GMSK modulator, i.e. the signal output by the complex multiplier 11 to the up-sampler 6.

The C1 MUX 19 provides zeros to the up-sampler 20 during the data symbol, where the 8PSK signal is provided to the DAC 8, during the three tail symbols, while the 8PSK signal is provided to the DAC 8 during the first seven bits of the eight guard symbols. Then, when the signal is switched to the GMSK signal, the C1 MUX 19 provides the GMSK signal of the quadratic branch of the GMSK modulator, i.e. the output of the complex multiplier 18 to the up-sampler 20 during the last, i.e. the eighth bit of the eight guard symbols of the guard interval. Then, during the three tail symbols and the data symbols, the output of the complex multiplier 18 is provided to the up-sampler 20.

In case it is switched from a time slot to which the GMSK modulation scheme is applied to a subsequent time slot applying the 8PSK modulation scheme, the C0 MUX 26 provides the output signal of the complex multiplier 11 to the up-sampler 6 during the data symbols, during the three tails symbols and during the first symbol of the eight guard symbols. Then, the C0 MUX 26 provides seven zeros during the remaining seven guard symbols to the up-sampler 6. With the start of the subsequent three tail symbols of the subsequent time-slot with the 8PSK modulation scheme, the C0 MUX 26 provides the output signal of the complex multiplier 4 to the up-sampler 6 during the tail symbols and the data symbols.

When a switching from the GMSK modulation scheme to the 8PSK modulation scheme is performed for subsequent time slots, the C1 MUX 19 provides the output signal of the complex multiplier 18 to the up-sampler 20 during the data symbols during the three tail symbols and during the first one of the eight guard symbols. Then, for the remaining seven bits of the guard symbol, for the following tail symbol and following data symbol where the 8PSK is performed, the C1 MUX 19 provides zeros to the up-sampler 20.

FIG. 9 shows an example of a hypothetical multi-slot TX envelope pt and the corresponding power $p_n$ which can be observed in an adjacent channel when a switching is performed from 8PSK in one slot to GMSK in the following slot The average power in the 8PSK TS is assumed higher than the average power in the GMSK TS. As may be taken from FIG. 9, in the envelope $p_{tx}$ between the 8PSk modulation scheme in the first slot and the GMSK modulation scheme in the second slot there is, according to an exemplary embodiment of the present invention, a dip. This dip is inserted, as explained in detail above, by either multiplying both I and Q signals with the dip-shaped waveform or by provoking a step-off response followed by a step-on response of the pulse-shaping filter, by filling the pulse-shaping filters with zeros. In spite of the fact that FIG. 9 shows a relatively small dip, the size of the dip may be varied, in accordance with the requirements in the respective system. As shown by the adjacent channel power $p_n$, the smooth dip in the TX envelope results in a transition in the adjacent channel power without showing a distinct peak. The dip is not resolved because it lasts shorter than the time constant of the resolution filter. Accordingly, the effect of the dip is to avoid steps in the I/Q signal due to switching the modulation scheme and to hide steps in the TX envelope due to switching of the power levels in subsequent time slots. As shown in FIG. 9, the introduction of the dip in the envelope allows to minimize interference in adjacent channels.

As already explained in detail above, the two multiplexers C0 MUX 26 and C1 MUX 19 serve for feeding complex value zeros rather than the complex value symbols into the up-samplers 6 and 20 which proceed the pulse-shaping filters FIR C0 7 and FIR C1 21. As already indicated above, it is also possible to further consider higher order branches other than the 0 and the 1 branch to improve the approximation in the modulator 24, as depicted in FIG. 6. Also, as a variant, it may be possible to combine the respective up-sampler with the subsequent pulse-shaping FIR filters into an efficient polyphase interpolation filter.

Advantageously, the modulator 24 as shown in FIG. 6 allows the use of a linear power amplifier, while avoiding interferences between adjacent channels. Also, a simple discrete gain VGA may be employed rather than a continuous gain VGA. Since the signal processing according to the present invention is carried out in the digital domain, no problems with tolerances of analogue circuits are encountered. Also, a generation of an analogue control voltage for a continuous VGA is made obsolete.

Due to the employment of the multiplexers C MUX 26 and C MUX 19 in the modulator 24 of FIG. 6, the dip-shaping is for free, since the filters and upsamplers are required anyway. Also the modulator 24 allows a simple control of the modulation and the double use of the FIR filter C 07 for the linear branch of the GMSK modulator and the 8PSK modulator. A modulator such as modulator 24 may preferably be used, for example, in GSM-, EDGE- or in EGPRS chipsets.

According to another exemplary embodiment of the present invention, advantageously, the retarding timing elements of the FIR filters, which are filled during regular operation sequentially, may be filled also with preferably initial values in parallel. This allows for additional freedom in the design of the transitions between time slots. Thus, for example, during the application of particular transmission concepts, it may be preferable to abruptly insert a GMSK modulated signal having a constant envelope at the beginning of the guard period after the smooth down ramping of a 8PSK time slot. According to an exemplary aspect of the present invention, advantageously, this may also be achieved by a parallel loading of suitable initial values.

The invention claimed is:

1. A modulator for generating a digital in-phase/quadrature (I/Q) signal having a plurality of time-slots, the modulator comprising;
    a first branch of $0^{th}$ order with a first pulse-shaping filter for providing a first linearly modulated signal in an I/Q domain;
    at least one second branch of higher order with a second pulse-shaping filter for providing a second linearly modulated signal in the I/Q domain;
    an adder for adding the first linearly modulated signal and the second linearly modulated signal to approximate a Gaussian Minimum Shift Keying (GMSK) modulator; and
    means for introducing a dip in an envelope of the digital I/Q signal in a guard interval between adjacent time-slots of the plurality of time-slots, the means for introducing the dip in the envelope of the digital I/Q signal in the guard interval between the adjacent time-slots of the plurality of time-slots including means for filling digital zeros into the first pulse-shaping filter and the second pulse-shaping filter.

2. The modulator in accordance with claim 1, further including an 8 Phase Shift Keying (8PSK) modulator including said first pulse-shaping filter.

3. The modulator of claim 2, wherein the guard interval is formed by a plurality of guard bits, the means for filling digital zeros including means for filling digital zeros into the second pulse-shaping filter during each time slot in an 8PSK mode of operation, filling digital zeros into the first pulse-shaping filter and the second pulse-shaping filter during all the guard bits except a first guard bit during a switching from a time slot in a GMSK mode of operation to a time slot in the 8PSK mode, and filling digital zeros into the first pulse-shaping filter and the second pulse-shaping filter during all the guard bits except a last guard bit during a switching from a time slot in the 8PSK mode to a time slot in the GMSK mode.

4. The modulator of claim 2, wherein the first branch includes a first mapper for receiving GMSK bits, a first digital multiplier for multiplying an output of the first mapper by a first complex phasor corresponding to an order to the first branch, a first multiplexer, and a first up-sampler; and wherein the 8PSK modulator includes a serial to parallel converter for receiving a serial data stream, a grey mapper for mapping an output of the serial to parallel converter into a complex signal, a further digital multiplier for multiplying an output of the grey mapper by a further complex phasor, said first multiplexer for feeding digital zeros, the output of the first digital multiplier or an output of the further multiplier, said first up-sampler for inserting zeros into the output of the first multiplexer and for providing an output thereof to said first pulse-shaping filter, and a further multiplexer for selecting the 8PSK modulator or the GMSK modulator.

5. The modulator of claim 1, wherein the guard interval is formed by a plurality of guard bits, the means for filling digital zeros including means for filling digital zeros into the first pulse-shaping filter and the second pulse-shaping filter during all the guard bits except a first guard bit and a last guard bit.

6. The modulator of claim 1, wherein the first branch includes a first mapper for receiving GMSK bits, a first digital multiplier for multiplying an output of the first mapper by a first complex phasor corresponding to an order to the first branch, a first multiplexer for feeding digital zeros or an output of the first digital multiplier, a first up-sampler for inserting zeros into an output of the first multiplexer and for providing an output thereof to the first pulse-shaping filter, wherein the second branch includes a finite state machine for receiving the GMSK bits, a second mapper for receiving an output of the finite state machine, a second digital multiplier for multiplying an output of the second mapper by a second complex phasor corresponding to an order to the second branch, a second multiplexer for feeding digital zeros or an output of the second digital multiplier, a second up-sampler for inserting zeros into an output of the second multiplexer and for providing an output thereof to the second pulse-shaping filter.

7. A signal processing method for generating a digital in-phase/quadrature (I/Q) signal having a plurality of time-slots, the signal processing method comprising the steps of:
under control of a modulator, generating a digital I/Q signal by,
generating a first linearly modulated signal of a $0^{th}$ order in an I/Q domain using a first pulse-shaping filter;
generating a second linearly modulated signal of a higher order in the I/Q domain using a second pulse-shaping filter in a quadratic branch; and
adding the first linearly modulated signal and the second linearly modulated signal to approximate a Gaussian Minimum Shift Keying (GMSK) modulator; and
generating a dip in an envelope of the digital I/Q signal in a guard interval between adjacent time-slots of the plurality of time-slots by filling digital zeros into the first pulse-shaping filter and the second pulse-shaping filter.

8. The signal processing method of claim 7, wherein the guard interval is formed by a plurality of guard bits, the filling digital zeros further includes filling digital zeros into the first pulse-shaping filter and the second pulse-shaping filter during all the guard bits except a first guard bit and a last guard bit.

9. A signal processing method, comprising:
under control of a modulator,
generating a digital in-phase/quadrature (I/Q) signal having a plurality of time-slots by selectively using a Gaussian Minimum Shift Keying (GMSK) modulation scheme when operating in a GMSK mode of operation and an 8Phase Shift Keying (8PSK) modulation scheme when operating in an 8PSK mode of operation, wherein the GMSK modulation scheme approximates a GMSK modulator to generate the digital I/Q signal by adding a series of at least two linearly modulated signals in an I/Q domain, wherein a first of the at least two linearly modulated signals is a $0^{th}$ element of the series and is generated using a first pulse-shaping filter and a second of the at least two linearly modulated signals is a higher order element of the series and is generated using a second pulse-shaping filter, and wherein the 8PSK modulation scheme uses a 8PSK modulator to generate the digital I/Q signal, the 8PSK modulator including the first pulse-shaping filter; and
generating a dip in an envelope of the digital I/Q signal in a guard interval between adjacent time-slots of the plurality of time-slots by filling digital zeros into at least one of the first pulse-shaping filter and the second pulse-shaping filter.

10. The signal processing method of claim 9, the guard interval is formed by a plurality of guard bits, and the filling digital zeros further includes filling digital zeros into the second pulse-shaping filter during each time slot in the 8PSK mode of operation, filling digital zeros into the first pulse-shaping filter and the second pulse-shaping filter during all the guard bits except a first guard bit during a switching from a time slot in the GMSK mode of operation to a time slot in the 8PSK mode of operation, and filling digital zeros into the first pulse-shaping filter and the second pulse-shaping filter during all the guard bits except a last guard bit during a switching from a time slot in the 8PSK mode of operation to a time slot in the GMSK mode of operation.

11. A transmitter, comprising:
a modulator for generating a digital in-phase/quadrature (I/Q) signal having a plurality of time-slots, the modulator comprising:
a first branch of $0^{th}$ order with a first pulse-shaping filter for providing a first linearly modulated signal in an I/Q domain;
at least one second branch of higher order with a second pulse-shaping filter for providing a second linearly modulated signal in the I/Q domain;
an adder for adding the first linearly modulated signal and the second linearly modulated signal to approximate a Gaussian Minimum Shift Keying (GMSK) modulator; and
means for introducing a dip in an envelope of the digital I/Q signal in a guard interval between adjacent time-slots of the plurality of time-slots, the means for introducing the dip in the envelope of the digital I/Q signal in the guard interval between the adjacent time-slots of the plurality of time-slots including means for filling digital zeros into the first pulse-shaping filter and the second pulse-shaping filter.

12. The transmitter of claim 11, wherein the guard interval is formed by a plurality of guard bits, the means for filling digital zeros including means for filling digital zeros into the first pulse-shaping filter and the second pulse-shaping filter during all the guard bits except a first guard bit and a last guard bit.

13. The transmitter of claim 11, wherein the first branch includes a first mapper for receiving GMSK bits, a first digital multiplier for multiplying an output of the first mapper by a first complex phasor corresponding to an order to the first branch, a first multiplexer for feeding digital zeros or an output of the first digital multiplier, a first up-sampler for inserting zeros into an output of the first multiplexer and for providing an output thereof to the first pulse-shaping filter, wherein the second branch includes a finite state machine for receiving the GMSK bits, a second mapper for receiving an output of the finite state machine, a second digital multiplier for multiplying an output of the second mapper by a second complex phasor corresponding to an order to the second branch, a second multiplexer for feeding digital zeros or an output of the second digital multiplier, a second up-sampler for inserting zeros into an output of the second multiplexer and for providing an output thereof to the second pulse-shaping filter.

14. The transmitter of claim 11, wherein the modulator further including an 8 Phase Shift Keying (8PSK) modulator including said first pulse-shaping filter.

15. The transmitter of claim 14, wherein the guard interval is formed by a plurality of guard bits, the means for filling digital zeros including means for filling digital zeros into the second pulse-shaping filter during each time slot in an 8PSK mode of operation, filling digital zeros into the first pulse-shaping filter and the second pulse-shaping filter during all the guard bits except a first guard bit during a switching from a time slot in a GMSK mode of operation to a time slot in the 8PSK mode, and filling digital zeros into the first pulse-shaping filter and the second pulse-shaping filter during all the guard bits except a last guard bit during a switching from a time slot in the 8PSK mode to a time slot in the GMSK mode.

16. The transmitter of claim 14, wherein the first branch includes a first mapper for receiving GMSK bits, a first digital multiplier for multiplying an output of the first mapper by a first complex phasor corresponding to an order to the first branch, a first multiplexer, and a first up-sampler; and wherein the 8PSK modulator includes a serial to parallel converter for receiving a serial data stream, a grey mapper for mapping an output of the serial to parallel converter into a complex signal, a further digital multiplier for multiplying an output of the grey mapper by a further complex phasor, said first multiplexer for feeding digital zeros, the output of the first digital multiplier or an output of the further multiplier, said first up-sampler for inserting zeros into the output of the first multiplexer and for providing an output thereof to said first pulse-shaping filter, and a further multiplexer for selecting the 8PSK modulator or the GMSK modulator.

* * * * *